United States Patent
Waagen et al.

(10) Patent No.: US 10,614,103 B2
(45) Date of Patent: Apr. 7, 2020

(54) MULTISCALE, HIERARCHICAL CLUSTERING ON CUSTOMER OBSERVABLES USING PERSISTENT GEOMETRIC FEATURES OF CO-OCCURRENCE SIMPLICIAL COMPLEXES

(71) Applicant: HRL Laboratories, LLC, Malibu, CA (US)

(72) Inventors: Alex N. Waagen, Agoura Hills, CA (US); Tsai-Ching Lu, Thousand Oaks, CA (US); Jiejun Xu, Chino, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/228,590

(22) Filed: Dec. 20, 2018

(65) Prior Publication Data
US 2019/0228021 A1    Jul. 25, 2019

Related U.S. Application Data

(60) Provisional application No. 62/621,558, filed on Jan. 24, 2018.

(51) Int. Cl.
| | | |
|---|---|---|
| G06F 16/00 | (2019.01) | |
| G06F 16/28 | (2019.01) | |
| G06F 17/27 | (2006.01) | |
| G06N 3/04 | (2006.01) | |
| G06K 9/62 | (2006.01) | |

(52) U.S. Cl.
CPC ........ *G06F 16/285* (2019.01); *G06F 17/2785* (2013.01); *G06K 9/6223* (2013.01); *G06N 3/04* (2013.01)

(58) Field of Classification Search
CPC .................................................... G06F 16/285
See application file for complete search history.

(56) References Cited

U.S. PATENT DOCUMENTS

| 8,630,975 B1 | 1/2014 | Guo et al. |
| 9,672,497 B1 | 6/2017 | Lewis et al. |
| 2015/0254370 A1 | 9/2015 | Sexton et al. |

OTHER PUBLICATIONS

Hatcher, Allen. "Algebraic topology." (2001), pp. 102-104.
Reimann, Michael W., et al. "Cliques of Neurons Bound into Cavities Provide a Missing Link between Structure and Function." Frontiers in Computational Neuroscience 11:48, (2017), pp. 1-16.
(Continued)

*Primary Examiner* — Grace Park
(74) *Attorney, Agent, or Firm* — Tope-McKay & Associates

(57) ABSTRACT

Described is a system for extracting multi-scale hierarchical clustering on customer observables (COs) data in a vehicle. The system selects a parameter for a set of incident data of COs data. Simplicial complexes are generated from the COs data based on the selected parameter. Face networks are generated from the simplicial complexes. For each face network, a set of connected components is extracted. Each connected component is transformed to a cluster of related COs, resulting in a first extracted relation between COs. The first extracted relation is used to automatically generate an alert at a client device when a second extracted relation different from the first extracted relation results from the transformation.

18 Claims, 11 Drawing Sheets

(56) References Cited

OTHER PUBLICATIONS

Singh, Gurjeet, Facundo Mernoli, and Gunnar E. Carlsson. "Topological methods for the analysis of high dimensional data sets and 3d object recognition." SPBG, 2007, pp. 1-11.

Papastamoulis, Panagiotis, and Magnus Rattray. "BayesBinMix: an R Package for Model Based Clustering of Multivariate Binary Data." R Journal 9.1, 2017, pp. 403-420.

Lancichinetti, Andrea, and Santo Fortunato. "Benchmarks for testing community detection algorithms on directed and weighted graphs with overlapping communities." Physical Review E 80.1: 016118, 2009, pp. 016118-1-016118-8.

Wu, Bin, et al. "A distributed algorithm to enumerate all maximal cliques in mapreduce." Frontier of Computer Science and Technology, 2009. FCST'09. Fourth International Conference on. IEEE, 2009, pp. 45-51.

Evangelopoulos, Nicholas E. "Latent semantic analysis." Wiley Interdisciplinary Reviews: Cognitive Science 4.6 (2013): pp. 683-692.

Śmieja, Marek, Szymon Nakoneczny, and Jacek Tabor. "Fast entropy clustering of sparse high dimensional binary data." Neural Networks (IJCNN), 2016 International Joint Conference on. IEEE, 2016, pp. 2397-2404.

Notification of Transmittal of International Search Report and the Written Opinion of the International Searching Authority for PCT/US2018/066967; dated Apr. 18, 2019.

International Search Report of the International Searching Authority for PCT/US2018/066967; dated Apr. 18, 2019.

Written Opinion of the International Searching Authority for PCT/US2018/066967; dated Apr. 18, 2019.

Chad Giusti et al., 'Two's Company, Three (or more) Is A Simplex', Journal of Computational Neuroscience, Jun. 11, 2016, pp. 1-14.

Florian T. Pokorny et al., 'Topological Trajectory Clustering with Relative Persistent Homology', In: 2016 IEEE International Conference on Robotics and Automation, Sep. 15, 2015, pp. 1-8.

| CO1 | CO2 | Dim 2 | Dim 3 | Dim 4 |
|---|---|---|---|---|
| SENSING AND DIAGNOSTIC MODULE<>SET | SERVICE AIR BAG<>MESSAGE ON | 0.01 | 0.01 | 0.01 |
| AIR BAG WARNING LIGHT<>ON | WIRES<>RUBBING | 0.01 | 0.05 | 0.15 |
| AIR BAG WARNING LIGHT<>STAY ON | CRUISE CONTROL<>SHUTS OFF | 0.15 | | |
| AIR BAG<>OUT | AIR BAG<>SHUTS OFF | 0.01 | | |
| AIR BAG<>DEPLOYED | AIR BAG<>SHORTS | 0.01 | | |
| DASH<>RATTLING SOUND | HEAD LIGHT<>OUT | 0.08 | 0.14 | 0.14 |
| BATTERY<>DEAD | ROOF<>LEAKING | 0.08 | 0.09 | |

FIG. 8

| SEAT<>FAIL | PLATE<>FAIL | TENSIONER<>FAIL | KIT<>FAIL | |
|---|---|---|---|---|
| LIGHT<>OUT | WIRES<>SHUTS OFF | AIR BAG<>OUT | SEAT<>OUT | AIR BAG WARNING LIGHT<>ON |
| SEAT<>BREAK ACCELERATION<>B1010 | CODE<>BOO15 | CODE<>BOO14 | CODE<>BOO22 | |
| | SENSOR CIRCUIT<>C0287 | ACCELERATION<>C0186 | SENSOR<>B1010 | |
| WRENCH<>CORROSION | JACK<>CORROSION | FLOOR<>CORROSION | AIR BAG<>CORROSION | TRUNK<>CORROSION |
| DASH<>B1181 | AIR BAG WARNING LIGHT<>B1181 | STEERING WHEEL<>B1181 | AIR BAG<>B1181 | |
| VEHICLE<>FRACTURE | CONNECTORS<>FRACTURE | WIRES<>FRACTURE | SEAT<>FRACTURE | WIRES<>BLACK |
| DOOR<>DISCONNECT | DOOR<>CRACK | INSULATOR<>CRACK | WIRES<>DISCONNECT | |
| LIGHT<>OUT | WIRES<>SHUTS OFF | AIR BAG<>OUT | SEAT<>OUT | AIR BAG WARNING LIGHT<>ON |
| ABS BRAKE<>TOWED | BATTERY<>INTERMITENTLY | CHECK ENGINE LIGHT<>TOWED | BATTERY<>FAILURE | BATTERY<>OUT |
| CABLE<>GROUND | BATTERY<>LEAKING | MOTOR<>MELT | BATTERY<>GROUND | |

FIG. 9

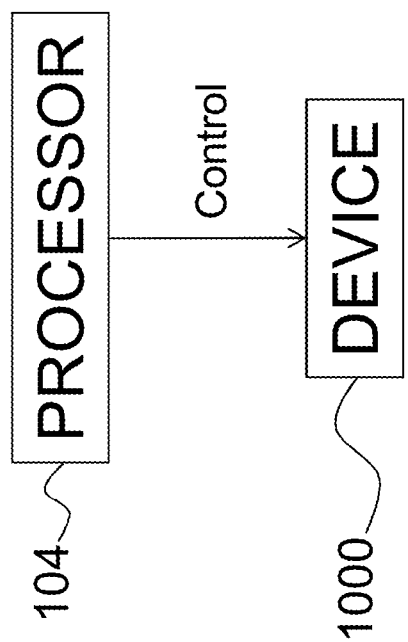

MULTISCALE, HIERARCHICAL CLUSTERING ON CUSTOMER OBSERVABLES USING PERSISTENT GEOMETRIC FEATURES OF CO-OCCURRENCE SIMPLICIAL COMPLEXES

CROSS-REFERENCE TO RELATED APPLICATIONS

This is a Non-Provisional Application of U.S. Provisional Application No. 62/621,558, filed in the United States on Jan. 24, 2018, entitled, "Multiscale, Hierarchical Clustering on Customer Observables Using Persistent Geometric Features of Co-Occurrence Simplicial Complexes," the entirety of which is incorporated herein by reference.

BACKGROUND OF INVENTION

(1) Field of Invention

The present invention relates to a system for extracting multi-scale hierarchical clusters on lists of customer observables and, more particularly, to a system for extracting multi-scale hierarchical clusters on lists of customer observables using persistent homology.

(2) Description of Related Art

Customer observable data can be represented as very high dimensional binary data, in the sense that each incident can be represented as a list of binary variables, with each variable a 1 or 0 depending on whether the customer observable occurred. The dimension is, thus, the number of total customer observables, which is often in the thousands.

There are existing methods to perform clustering on multivariable binary data. For instance, sparse entropy clustering (see the List of Incorporated Literature References, Literature Reference No. 8 is a fast, scalable method of clustering sparse binary data. One disadvantage is that the clusters do not overlap, meaning customer observables could not be clustered into multiple "contexts" in which they have different relations with different customer observables. Sparse entropy clustering is also not multiscale, only outputting a single set of clusters which minimize entropy without control over the size of clusters.

BayesBinMix (see Literature Reference No. 4) is an R package that uses Markov Chain Monte Carlo to perform clustering on multivariate binary data. The disadvantage of this method is that it does not scale well to very high dimensions, in addition to not being multiscale and not outputting overlapping clusters.

Persistent homology (see Literature Reference No. 2) has been used on brain networks to find functional categories of neurons based on cliques which form high dimensional holes. However, many important interaction details are missed through analysis of the topological shape of the data alone. For instance, if there is a causal chain of COs that A causes B causes C causes D, topologically this causation chain is trivial unless D also causes A. In particular, if there is an underlying causal network on the COs that is tree-like, topological study will miss many important relations.

Latent semantic indexing (see Literature Reference No. 7) is a technique of natural language processing that could be used to cluster incidents or COs based on the original verbatim of the reports. Latent semantic indexing analyzes relationships between a collection of documents and the words contained in them based on the frequency of words in each document compared to the overall frequency. However, this method is not multiscale or hierarchical, and does not capture indirect relations. Moreover, it does not cluster the COs directly, since it is applied to the original verbatim.

Thus, a continuing need exists for a system for extracting multi-scale, hierarchical, overlapping clusters on customer observable data that can capture both indirect and direct co-occurrence relations in multiple dimensions in a scalable fashion.

SUMMARY OF INVENTION

The present invention relates to a system for extracting multi-scale hierarchical clusters on lists of customer observables (COs) and, more particularly, to a system for extracting multi-scale hierarchical clusters on lists of COs using persistent homology. The system comprises one or more processors and a non-transitory computer-readable medium having executable instructions encoded thereon such that when executed, the one or more processors perform multiple operations. The system selects at least one parameter having a value for a set of incident data comprising COs data. Simplicial complexes are generated from the COs data based on the at least one selected parameter. Face networks are generated from the simplicial complexes. For each face network, a set of connected components is extracted. Each connected component in each set of connected components is transformed to a cluster of related COs, resulting in at least a first extracted relation between COs, wherein the first extracted relation is used to automatically generate an alert at a client device when a second extracted relation different from one of the first extracted relations results from said transformation.

In another aspect, in generating the simplicial complexes, the system determines a pairwise mutual information measure for each pair of COs; links each pair of COs with a pairwise mutual information measure greater than the value of the at least one selected parameter; identifies k cliques of COs in which every possible link exists, and replaces each k clique with a k simplex.

In another aspect, each face network is a network created by linking all k-simplices that share a face.

In another aspect, in transforming each connected component to a cluster of related COs, for each distinct connected component C of a face network, the system transforms the connected component C into a list of vertices, and based on the list of vertices, the system outputs multiscale hierarchical, overlapping clusters of COs.

In another aspect, the extracted relations between COs are used to identify different contexts in which COs appear and relations between COs.

In another aspect, the system varies the value of the at least one parameter, wherein only COs which persist as the value of the at least one parameter is varied are used for generating simplicial complexes.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 8 is a table illustrating outputs of the clustering algorithm according to some embodiments of the present disclosure;

FIG. 9 is a table illustrating example clusters of COs according to some embodiments of the present disclosure;

FIG. 10 is a flow diagram illustrating using a processor to control a device using the system according to some embodiments of the present disclosure.

DETAILED DESCRIPTION

Figure 1:
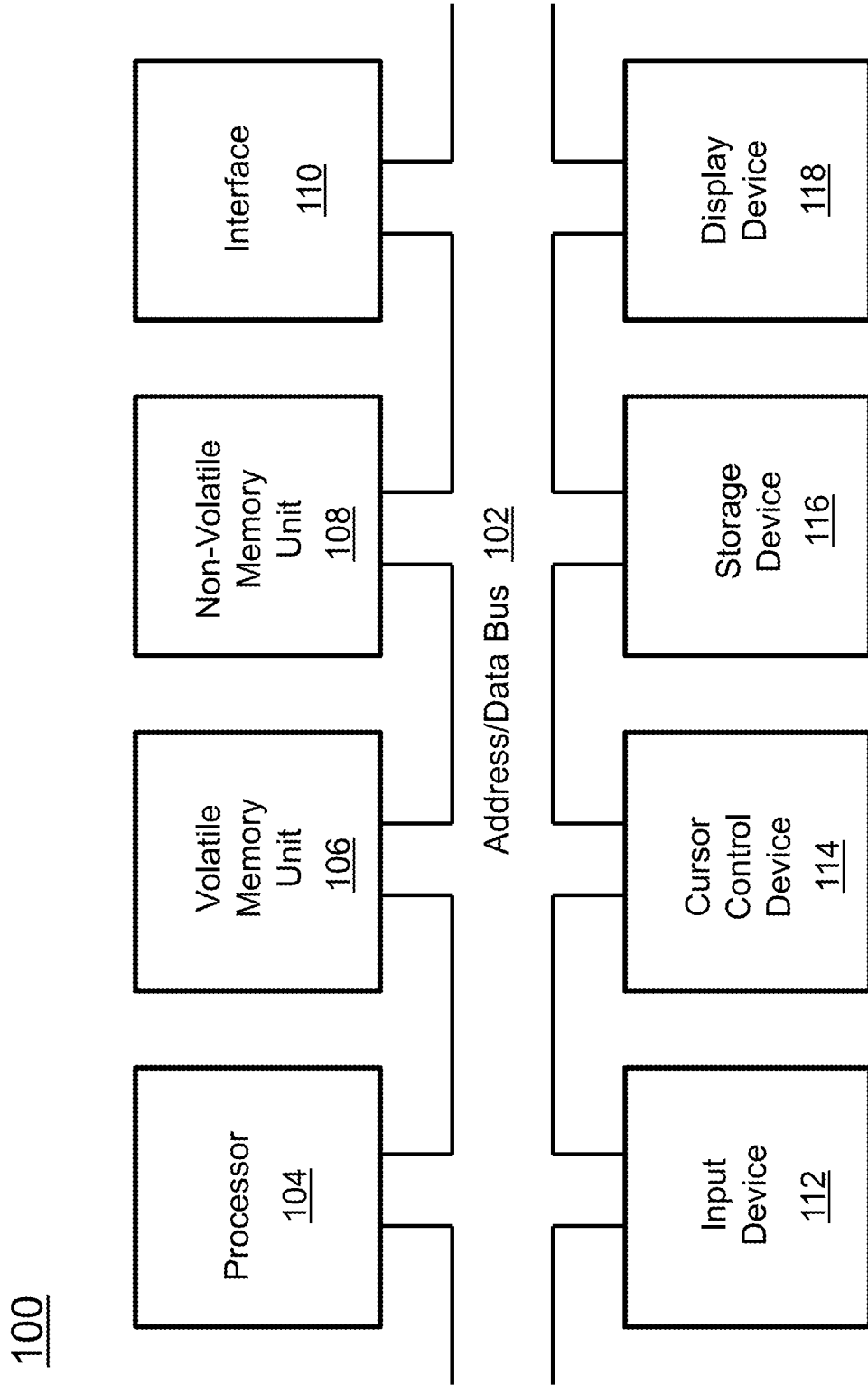
FIG. 1 is a block diagram depicting the components of a system for extracting multi-scale hierarchical clusters on lists of customer observables according to some embodiments of the present disclosure.

The present invention relates to a system for extracting multi-scale hierarchical clusters on lists of customer observables and, more particularly, to a system for extracting multi-scale hierarchical clusters on lists of customer observables using persistent homology. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) LIST OF INCORPORATED LITERATURE REFERENCES

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. Munkres, James R. Elements of algebraic topology. CRC Press, Chapter 1, 2018.
2. Reimann, Michael W., et al. "Cliques of Neurons Bound into Cavities Provide a Missing Link between Structure and Function." Frontiers in Computational Neuroscience 11: 48, 2017.
3. Singh, Gurjeet, Facundo Mémoli, and Gunnar E. Carlsson. "Topological methods for the analysis of high dimensional data sets and 3d object recognition." SPBG, 2007.
4. Papastamoulis, Panagiotis, and Magnus Rattray. "BayesBinMix: an R Package for Model Based Clustering of Multivariate Binary Data." R Journal 9.1, 2017.
5. Lancichinetti, Andrea, and Santo Fortunato. "Benchmarks for testing community detection algorithms on directed and weighted graphs with overlapping communities." Physical Review E 80.1: 016118, 2009.
6. Wu, Bin, et al. "A distributed algorithm to enumerate all maximal cliques in mapreduce." Frontier of Computer Science and Technology, 2009. FCST'09. Fourth International Conference on. IEEE, 2009.
7. Evangelopoulos, Nicholas E. "Latent semantic analysis." Wiley Interdisciplinary Reviews: Cognitive Science 4.6 (2013): 683-692.
8. Śmieja, Marek, Szymon Nakoneczny, and Jacek Tabor. "Fast entropy clustering of sparse high dimensional binary data." Neural Networks (IJCNN), 2016 International Joint Conference on. IEEE, 2016.

(2) PRINCIPAL ASPECTS

Various embodiments of the invention include three "principal" aspects. The first is a system for extracting multi-scale hierarchical clusters on lists of customer observables. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
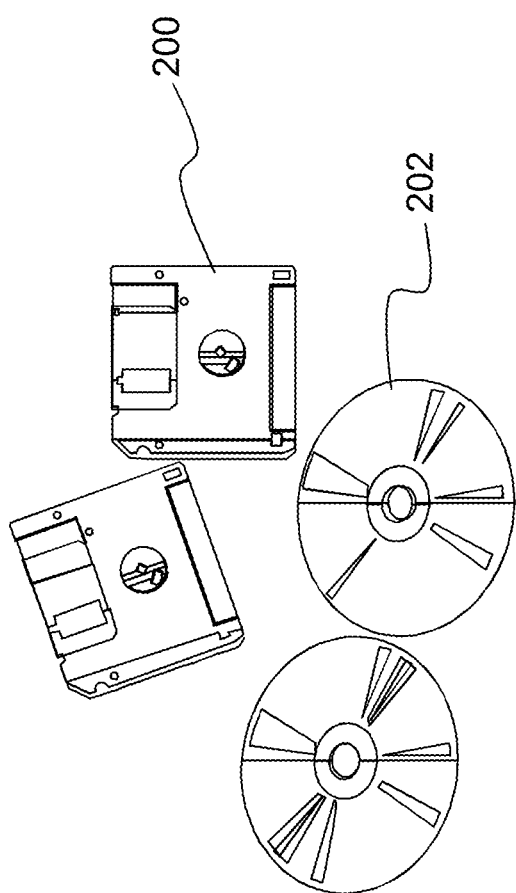
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) SPECIFIC DETAILS OF VARIOUS EMBODIMENTS

Described is a method to extract multi-scale high order, hierarchical clusters on lists of customer observables corresponding to incidents in Global Analysis and Reporting Tool (GART) data, which consists of 2001 individual instances with a verbatim report and a corresponding set of customer observables (COs) extracted from the verbatim report. For the purposes of this application, a customer observable is defined as a notable quality that is observed by the customer in the context of a specific incident, and which are later reported.

Figure 11:
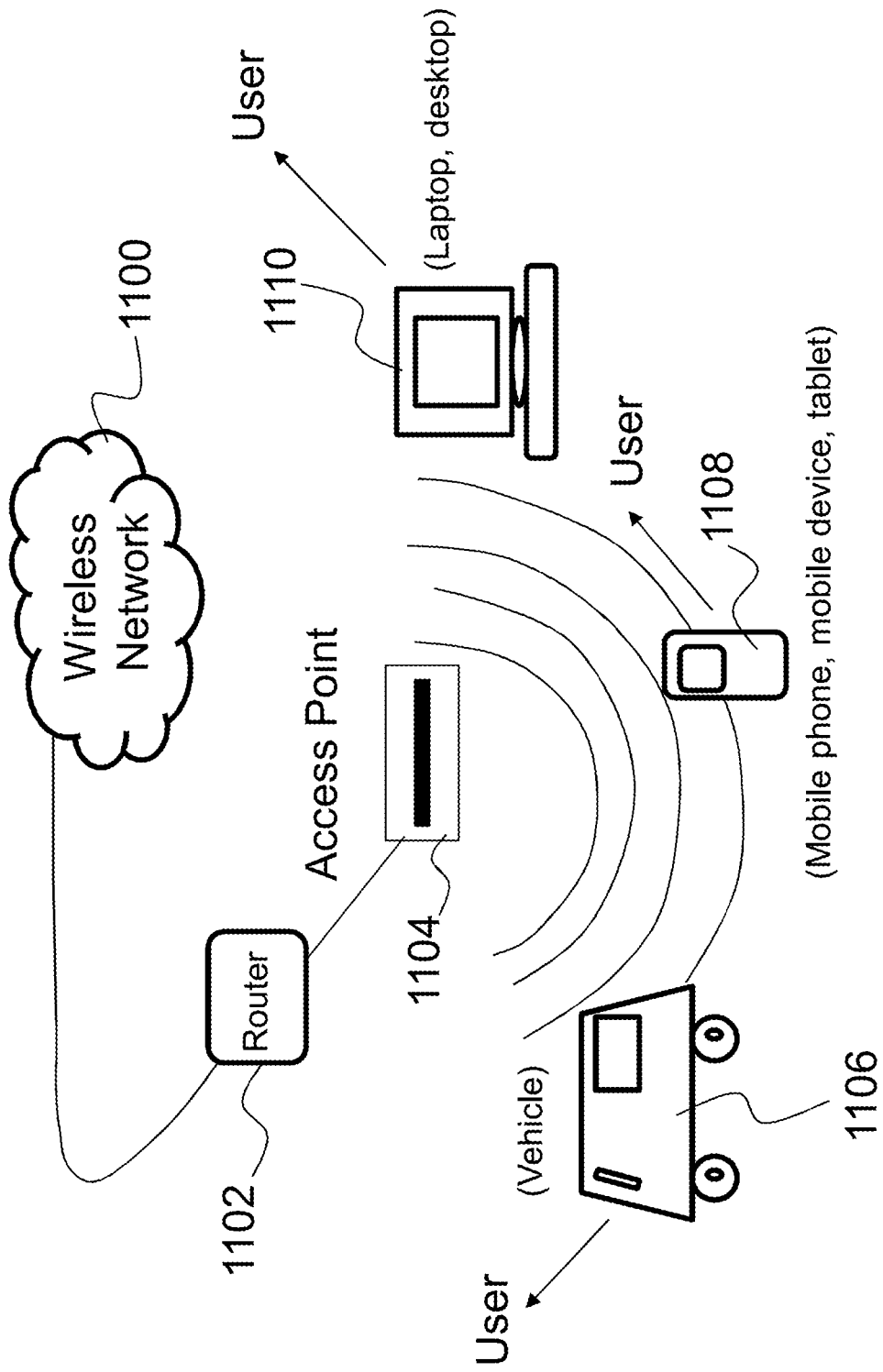
FIG. 11 is an illustration of wireless data transmission according to some embodiments of the present disclosure.

Although not considered in detail in this application, CO data could also be obtained directly from a given platform, be it an automobile, an airplane, or any vehicle or machine that may exhibit equipment failures and may require maintenance. That data could be obtained wirelessly, using, for example, a cellular connection, a wireless modem, or satellite-based communications, or could be obtained using a hardware data port. The data could be received as user input (from e.g., a mechanic or service technician) or the platform could transmit the data automatically to a database or a user (again, a mechanic or service technician, for example). In the case of automated data transfer, transmission via a cellular, a wireless, or a satellite-based network is viewed as the preferred embodiment, but any means of data transfer could be employed. FIG. 11 illustrates wireless data transmission via an example wireless network 1100 (e.g., internet), which includes a router 1102 and a wireless access point 1104 in wireless communication with devices, such as a vehicle 1106, a mobile device, 1108, and desktops/laptops 1110, which can transmit/display alerts to users.

These customer observables are easier to analyze than the verbatim text, but their meanings can still be understood in the context of natural language. For example, for a verbatim report "customer reports battery died while driving, on inspection it was found battery leaks, and the vehicle was towed" could be described by 3 COs: BATTERY< >DIED, BATTERY< >LEAKS, and CAR< >TOWED. Ideas from persistent homology are used to create a series of simplicial complexes and to extract mesoscale geometric features in order to extract clusters of customer observables (COs) extracted from the text of the customer's report, which may have higher dimensional relations based on causation or similarity. Persistent homology is a method for computing topological features of a space at different spatial resolutions. Different clusterings in each dimension are output to represent different levels of co-occurrence, with the k-dimensional clusters capturing COs that are associated via co-occurrences of sets of k COs. In addition, different clusterings based on a parameter $\varepsilon$ are output, with less complete but more accurate clusters for smaller values of $\varepsilon$. Synthetic data is generated with a randomly generated causal network. Using geometric persistence data from the co-occurrence simplicial complexes of this synthetic data, accurate reproduction of clusters of causally related COs is possible. This can potentially be used to identify unexpected relations on COs in real datasets and identify emerging hazards on specific vehicle models, for instance.

There are many unique aspects of the system described herein. For instance, the system utilizes ideas from persistent homology in order to extract multiscale structure, but utilizes persistence of geometric structure rather than topological structure. Rather than storing information on persistence of topological "holes" in the simplicial complexes built from the data as in persistent homology, the system described herein stores information on connected components of networks based on the geometry of the simplicial complexes. Furthermore, the system generalizes pairwise co-occurrence relations to higher dimensions using a simplicial complex approach, as described in Section 3.3 below, allowing simplification of complex, higher dimensional associations to a short list of numbers which succinctly represent how closely related each pair of COs are in each dimension, where "dimension" refers to the number of COs which can indirectly interact to result in an observed relation between the two COs.

A purpose of the invention according to embodiments of the present disclosure is to output hierarchical clusters of COs, which at the lowest level in the hierarchy are clusters containing only individual COs and at the highest level in the hierarchy is a single cluster containing all COs. At intermediate stages, clusters may overlap with individual COs contained in more than one cluster, but they are strictly increasing in the sense that moving to a higher level, a given cluster can only gain but not lose COs. All COs contained in a given cluster are supposed to be related, and in particular there may be unexpected relations between COs which can signal the emergence of a hazardous condition already known to be associated to a given subset of COs. An example of a "hazardous condition" is the steering wheel locking up while the vehicle is still in motion, potentially resulting in an accident. Connected components of simplicial complexes are utilized to output multiscale hierarchical, overlapping clusters of COs. The overlapping nature of the clustering accounts for context in which the same CO may be related to different collections of COs depending on the context. For the purposes of this disclosure, two COs that have a tendency to occur together more than they would by random chance are referred to as "related". "Overlapping" means that the same CO may be contained in multiple distinct clusters of COs, such that the clusters overlap with respect to the COs contained in both.

The technique described herein relies on clique finding, which scales reasonably well for fixed dimension simplicial complexes and can be distributed across many processors (see Literature Reference No. 6). As described in detail below, even relatively low dimensional simplicial complexes achieve high accuracy on the synthetic dataset.

Persistent homology has been used to find functional clusters on brain networks (see Literature Reference No. 2), but these clusters correspond to topological features, such as high dimensional holes. Persistent homology cannot be used to find clusters of causally linked COs, since many such clusters are topologically trivial. The technique according to embodiments of the present disclosure outputs clusters that correspond to geometric features (connected components of CO relations as described in section 3.4) which are never trivial so long as any sufficiently strong relations between COs exist. The technique utilizes not just pairwise relations between COs but higher order relations, which are relations among more than just two COs, represented by simplices. A k-dimensional simplex has k+1 vertices, and individual COs are represented by its vertices. Additionally, the method discovers indirect relations between COs which never co-occur in any specific incident.

While network approaches can describe relations between pairs of objects in a system, they may not always be useful in describing phenomena that involve higher order dynamics. For instance, COs extracted from a list of vehicle-related incidents in a database tend to be noisy and highly sensitive to context. Different COs can have different meanings depending on co-occurring COs, previous incidents, vehicle model, mileage, and various pieces of information, which may not be available.

In one embodiment, two kinds of relations between COs of are interest: similarity and causality. For example, very similar COs such as WIRE< >BLACK and WIRE< >BURNED may represent the same information and be effectively the same, depending on context. Moreover, a causality link may be extremely obvious, such as BATTERY< >LEAKS and CAR< >TOWED, but they may be non-obvious as well, such as the relation between frayed wires and the air bag light.

One objective is to identify high dimensional associations between COs and output clusters of overlapping COs that are related to one another in order to capture both different contexts in which COs appear and the relations between them. If only pairwise relations between COs that co-occur are examined, or if only the original incidents are examined without throwing away unnecessary information, either all important context is lost or all ability to generalize and find patterns is lost. Thus, the method according to embodiments of the present disclosure takes a multiscale approach that allows the setting of a dimension parameter k that determines the maximum number of co-occurrences considered relevant. If k=2 is set, for example, the system considers relations on triples of COs rather than pairs since a two dimensional simplex is a triangle with each vertex representing a CO.

It is also necessary to filter out relations which seem random or spurious. To do this, concepts from persistent homology are utilized and the system varies the value of at least one parameter; only features which persist in the system as the parameter $\varepsilon$ is varied are considered, which represents a threshold of significance. Varying the value of the parameter $\varepsilon$ means that the value is varied from a minimal value to a maximal value by a fixed step size, which are three parameters $\varepsilon_{min}$, $\varepsilon_{max}$, and $\varepsilon_{step}$.

If a triple of COs tends to occur together, a triangle with those COs as vertices should appear in the system at a relatively small value of $\varepsilon$. If those three COs together cause a fourth CO, the four of them should become vertices of a tetrahedron as $\varepsilon$ is increased further. The more the parameter $\varepsilon$ is increased, the more information is considered to be relevant rather than random. By building up this structure and finding high dimensional components of networks referred to as $G_k(\varepsilon)$, high dimensional relations are captured as they appear and hierarchically increasing clusters are output in each dimension. Note that as $\varepsilon$ increases, only additional links are added to $G_k(\varepsilon)$, and the components only grow larger. This greatly simplifies the system's ability to store information on these clusters; since clusters can only grow larger, the system only needs to store the smallest value of $\varepsilon$ for which two COs are connected in $G_k(\varepsilon)$ for each value of k considered.

In addition, high level information which simplifies the complicated geometric structure is provided. For each pair of COs, a list of numbers is associated, which describes the lowest epsilon values at which they are output in at least one cluster together for each dimension k=2, 3, . . . d. This allows pairwise comparisons of individual COs which, nevertheless, include much of the clustering data contained in the geometric structure of the co-occurrence simplicial complexes.

(3.1) Data

The data considered consists of 2001 individual incidents from the GART database with a verbatim description of the incident, a list of customer observables (COs) extracted from the verbatim, and an output column with an indication of whether each incident represented a hazard condition. Additionally, the information that wire fraying is associated with the air bag warning light was provided. Many individual COs are associated with those two events, such as "WIRES< >DAMAGED" and "AIRBAG< >B101D", where B101D represents a code for "Airbag tell-tale light on".

(3.2) System and Method

Figure 3:
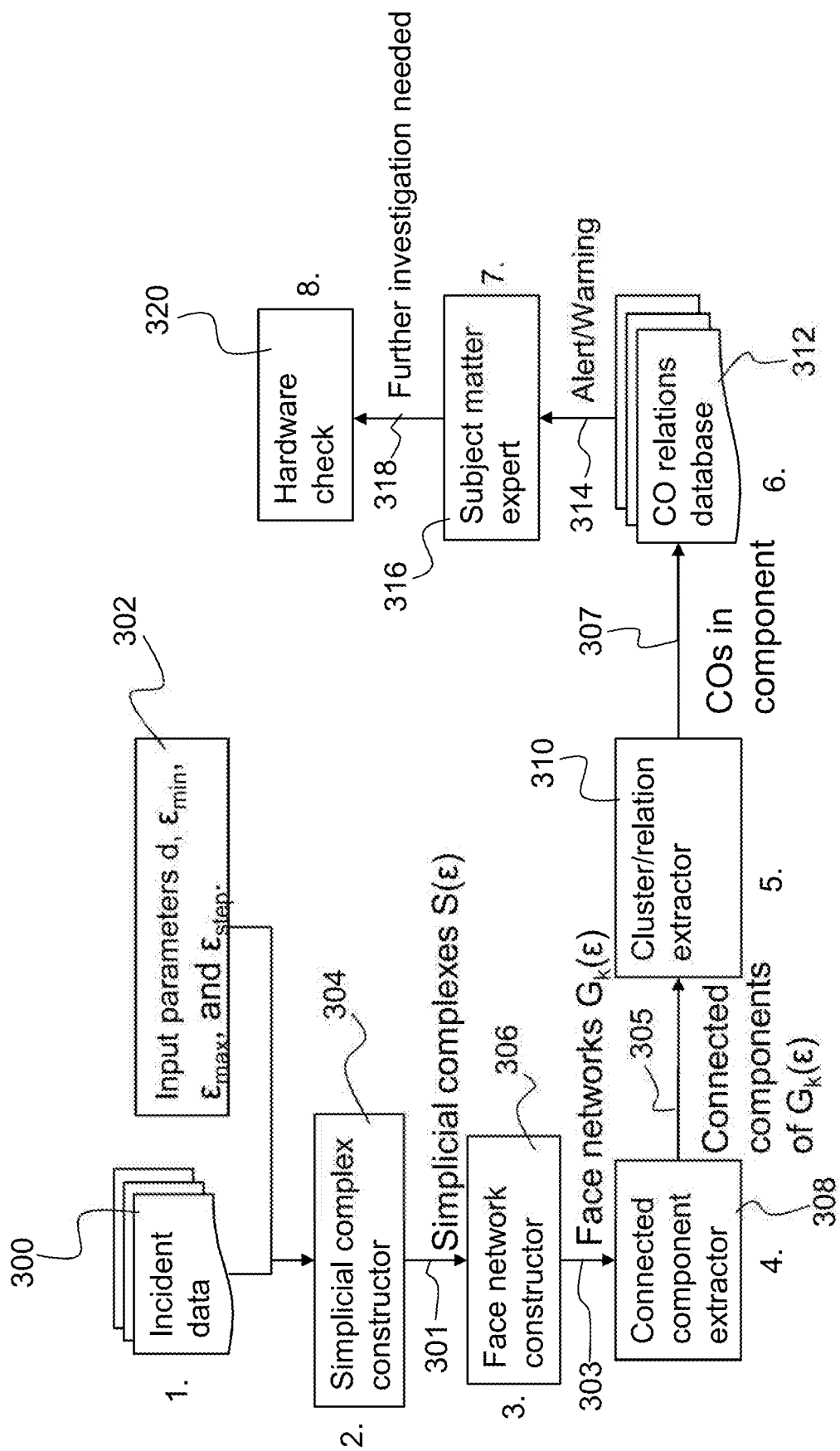
FIG. 3 is a flow diagram illustrating cluster extraction and warning generation according to some embodiments of the present disclosure.

FIG. 3 illustrates the operation of the clustering method and warning generation according to embodiments of the present disclosure. The system will go through the following steps:

1. Input incident data which consists of a collection of lists of customer observables (element 300), such as the GART data described above. Choose input parameters (element 302).
2. Using the input parameters, construct the simplicial complexes S($\varepsilon$) (element 304).
3. Construct the face networks $G_k(\varepsilon)$ (element 306) using the simplicial complexes S($\varepsilon$) (element 301).
4. Extract the set of connected components (element 308) in each face network $G_k(\varepsilon)$ (element 303).
5. Taking the set of connected components as input (element 305), transform each connected component (element 310) to a cluster of related COs (element 307).
6. Compare each extracted relation to a known relations database (element 312). If the relation does not exist, emit an alert or warning (element 314). A previously unknown relationship constitutes an anomalous occurrence and may be something that merits investigation and potentially a recall.
7. A subject matter expert is alerted by the system, for instance via a graphical interface which displays a dialog box with all the relations previously unlisted (i.e., new) in the database, and verifies the possible validity of the relation(s) (element 316).
8. If subject matter expert determines that further investigation is required (element 318), recommends direct investigation of the hardware by additional experts (element 320) who may recommend a recall.

The CO relations database (element 312) consists of known relations that can be considered input to the system described herein. The CO relations database (element 312) can also be constructed using a training step by inputting old incident data that is known not to contain any anomalies before inputting additional incident data that may contain anomalies.

(3.3) Building Simplicial Complexes

Figure 4:
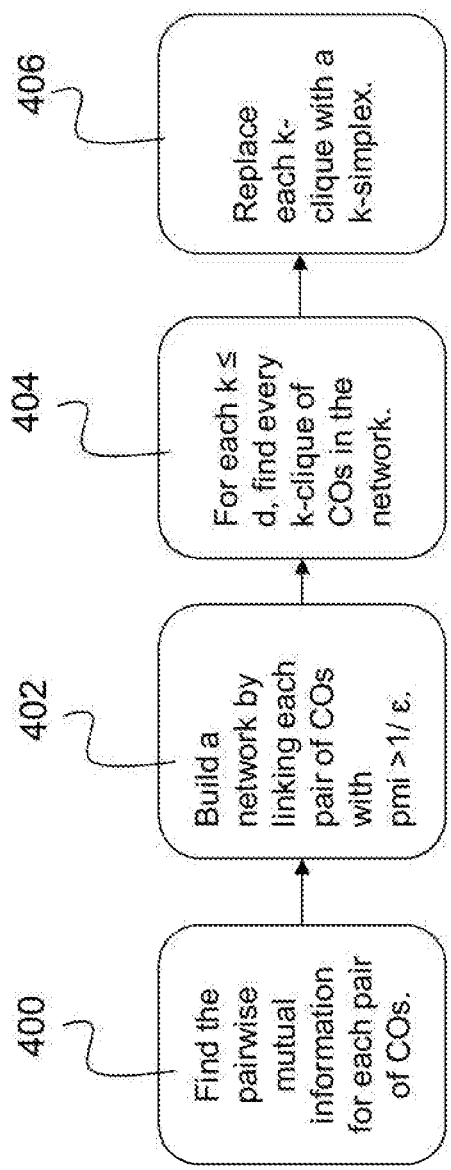
FIG. 4 is a flow diagram illustrating building a co-occurrence simplicial complex from incident data according to some embodiments of the present disclosure.

Simplicial complexes can be viewed as a sort of higher order network which can preserve more than just pairwise information. The basic object of a simplicial complex in d dimensions is a k-simplex for k=0, 1, 2, . . . , d. A 0-simplex is a point, a 1-simplex is a line, a 2-simplex is an equilateral triangle, and a 3-simplex is a regular tetrahedron. Generally, a k-simplex is the convex hull of a set of k+1 equidistant vertices, which can be thought of intuitively as a k-dimensional tetrahedron. A k-dimensional simplex for k>2 is a higher dimensional tetrahedron. A simplicial complex can be built from a set of simplices by gluing together vertices, lines, faces, or higher dimensional faces. For specific details and more theoretical background, see Literature Reference No. 1. As shown in FIG. 4, in order to build the d-dimensional simplicial complex S(e), the following steps are followed:

1. After finding the pairwise mutual information for each pair of COs (element 400), build a network on the COs by linking any two COs x and y if $\mu(x,y)<\varepsilon$ for some metric p (element 402).
2. For each k<d, find all k-cliques of COs, sets of k COs in which every possible link exists (element 404).
3. Replace each k-clique found in step 2 with a k-simplex (element 406).

Note that a simplicial complex exists for every possible metric $\mu$ and for each positive value of $\varepsilon$. The dissimilarity metric $\mu$ is defined as $1/\log[p(x,y)/p(x)p(y)]$, and the pairwise mutual information is $\log[p(x,y)/p(x)p(y)]$, where p(x,y) is the empirical probability that a pair of COs co-occur in a randomly chosen incident, and p(x) is the probability that an individual CO x occurs in a randomly chosen incident. Hence, the ratio $p(x,y)/p(x)p(y)$ describes how many times more likely a pair of COs is to co-occur than they would by random chance. Two objects are related if $\mu<\varepsilon$, or equivalently if $pmi>1/\varepsilon$.

Having specified a metric, pairwise mutual information, there is now a one-parameter family of simplicial complexes depending on the value of $\varepsilon$. For $\varepsilon=0$, the complex is just a set of 0-complexes, one for each CO. For $\varepsilon$ sufficiently large, every incident with k COs will be represented by a k-simplex. Hence, as c is increased from 0 to that sufficiently large value, the context of individual incidents becomes more dominant in the simplicial complex structure.

(3.4) Face Network

Define the "face network" $G_k(\varepsilon)$ as follows:
1. The nodes of $G_k(\varepsilon)$ are the k-simplices in $S(\varepsilon)$.
2. Two nodes are linked if they share a (k−1)-dimensional face (e.g., two triangles in $G_2(\varepsilon)$ are linked if they share a side).

In order to give some intuition for the information contained in the networks $G_k(\varepsilon)$, suppose there are four COs: A,B,C,D. If there is a link in the network $G_2(\varepsilon)$ from (A,B,C) to (B,C,D), this indicates that A and D both co-occur in incidents with B and C, capturing a second order relation between B and C regardless of whether the two ever co-occur. In general, the network $G_k(\varepsilon)$ links sets of k COs which tend to co-occur to a k+1th CO, which co-occurs with both sets in a different context. There may also be longer chains of indirect relations. Extend the previous example to link (A,B,C) to (B,C,D), and (B,C,D) to (C,D,E). Then there is a third order relation between A and E, two COs which may have no direct co-occurrences or even second order relations.

Figure 5:
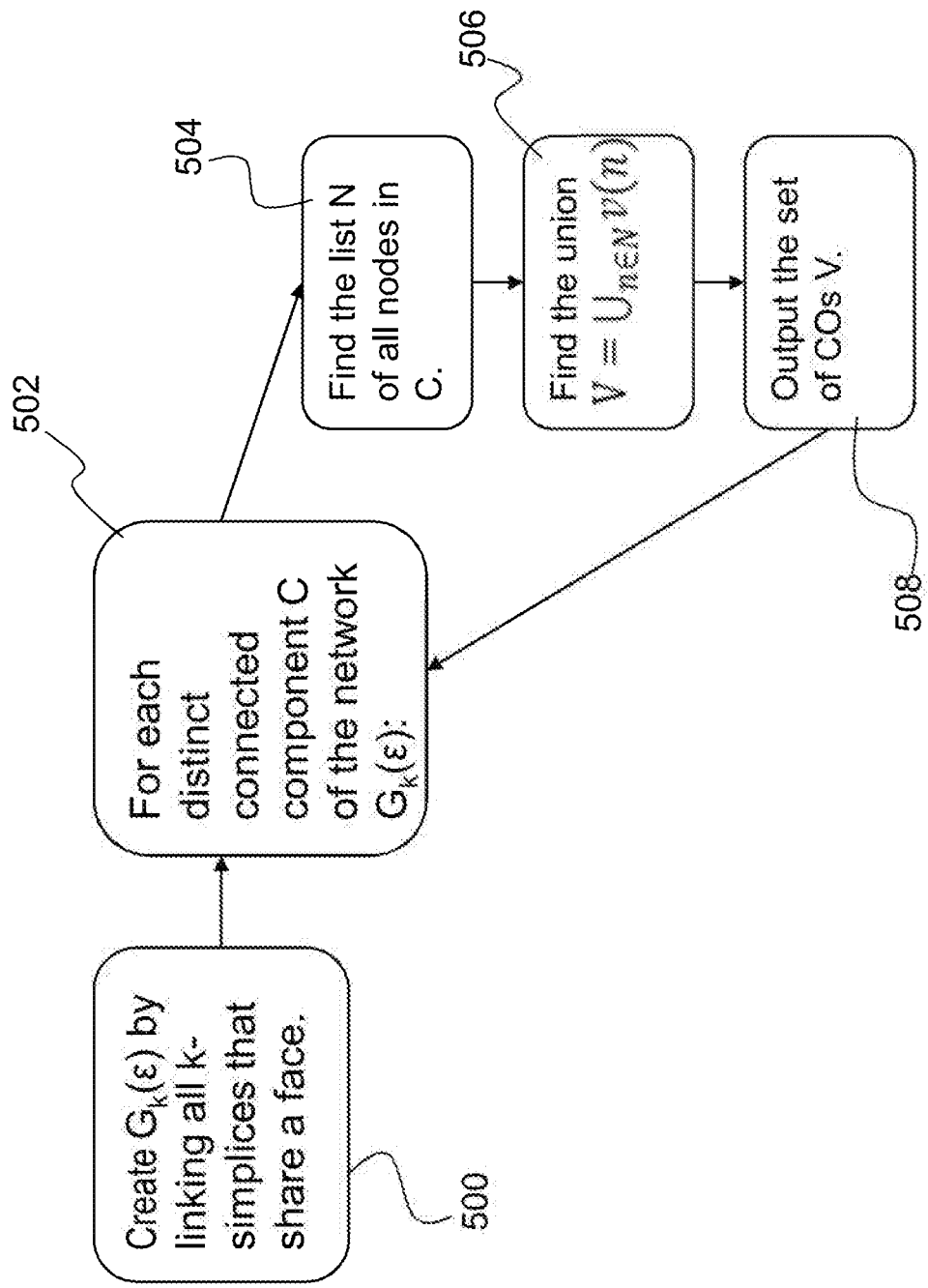
FIG. 5 is a flow diagram illustrating an algorithm to find overlapping customer observables (COs) for fixed k and ε according to some embodiments of the present disclosure.

Since each node n represents a simplex, let V(n) be the set of vertices of the simplex represented by n, which is a set of COs. The algorithm, which takes as input the GART data and parameters k and $\varepsilon$ and outputs overlapping clusters of COs, is shown in FIG. 5. Network $G_k(\varepsilon)$ is created by linking all k-simplices that share a face (element 500) (i.e., they have k−1 vertices in common). For each distinct connected component C of the network $G_k(\varepsilon)$ (element 502), the system finds the list N of all nodes in C (element 504), finds the union $V=\cup_{n \in N} v(n)$ (element 506) of all vertices of each simplex corresponding to the nodes in C, and outputs the set of COs in V (element 508). In other words, the networks $G_k(\varepsilon)$ for k=2, 3, . . . , d are decomposed into connected components C for any given value of epsilon. Each connected component C in $G_k(\varepsilon)$ is transformed into a list of vertices V, which constitutes a hierarchical clustering of the COs. The largest clusters are those obtained from the connected components of $G_2(\varepsilon)$, and the smallest from $G_d(\varepsilon)$. By examining the clusters for various values of k and E, known relations between COs, such as the air bag warning light and wire-related issues, can be verified. FIG. 8 is a table listing outputs of the clustering algorithm described herein, showing the minimum E value for each dimension at which the pair of COs are in the same connected component in $G_k(\varepsilon)$. A blank entry means no such relationship was found for any value of $\varepsilon$.

(3.5) Clustering Algorithm with Hierarchy

The steps of the clustering algorithm are as follows:
1. Choose parameters d, $\varepsilon_{min}$, $\varepsilon_{max}$, and $\varepsilon_{step}$ (described in detail in section 3.6).
2. Build simplicial complexes $S(\varepsilon)$ for $E=\varepsilon_{min}$, $\varepsilon_{min}+\varepsilon_{step}$, $\varepsilon_{min}+2\varepsilon_{step}$, . . . , $\varepsilon_{max}$.
3. Build face networks $G_k(\varepsilon)$ for $E=\varepsilon_{min}$, $\varepsilon_{min}+\varepsilon_{step}$, $\varepsilon_{min}+2\varepsilon_{step}$, . . . , $\varepsilon_{max}$ and k=1, 2, . . . d.
4. Find the connected components of $G_k(\varepsilon)$ for all chosen parameter values.
5. For each connected component $C_i$ for I=1, 2, . . . , m where m is the total number of connected components in $G_k(\varepsilon)$, extract $V(C_i)$ and label the cluster of COs as $R_{i,k,\varepsilon}$.
6. Output all clusters $R_{i,k,\varepsilon}$.

For each fixed k, the clusters $\{R_{i,k,\varepsilon}\}$ can be arranged into a hierarchical structure. Each cluster $R_{i,k,\varepsilon min}$ can be linked to at least one cluster that is larger or of equal size in $R_{i,k,\varepsilon min}+\varepsilon_{step}$ and which contains $R_{i,k,\varepsilon min}$ as a subset. Similarly, links can be formed from $R_{i,k,\varepsilon min}+\varepsilon_{step}$ to $R_{i,k,\varepsilon min}+2_{\varepsilon step}$ and so on to create a tree rooted at the original cluster $R_{i,k,\varepsilon min}$. By building such a tree for each individual cluster until every cluster is included in at least one tree, the hierarchical structure of the clustering can be represented as a forest of trees. Those closest to the root are direct relations, and those further down on the tree are more indirect.

(3.6) Choosing Parameters

A set of E values determined by $\varepsilon_{min}$, $\varepsilon_{max}$, and $\varepsilon_{step}$ and a maximum dimension d must be input as parameters (element 302) as illustrated in FIG. 3, but it isn't immediately clear how these parameters should be chosen. The maximum dimension d in many cases must be chosen in order to limit computational complexity, as finding the maximum size clique in a network takes exponential time in the worst case. In a theoretical sense, the parameter d should be chosen to match the maximal number of related COs in any one incident minus one. That is, if it is certain that no more than 3 related COs will occur in any individual incident, take d=2 so that the highest dimensional geometric object in the simplicial complex is a triangle. In most cases this theoretical value will be unknown, although a good heuristic is to find the smallest value of d which requires a large value of $\varepsilon_{min}$ before d-simplices are formed in the simplicial complex. This indicates that relations among groups of d+1 COs are weak. In analysis of synthetic data d=3 is set, as this is sufficient to accurately identify clusters.

In order to choose the E parameters, it is useful to consider the inclusion rate, which is defined as the portion of nodes which are included in at least one cluster. The parameters $\varepsilon_{min}$ and $\varepsilon_{step}$ should be chosen such that the simplicial complex $S(\varepsilon_{min})$ is trivial (every simplex is a 0-simplex, a single point), but $S(\varepsilon_{min}+\varepsilon_{step})$ is nontrivial (at least one simplex is more than just a single point) with a low inclusion rate. The largest value of $\varepsilon_{min}$ for which $S(\varepsilon_{min})$ is trivial can be approximated quickly using, for example, a binary search. Successively smaller values of $\varepsilon_{step}$ can then be chosen to ensure a low inclusion rate of at most 0.1 in $S(\varepsilon_{min}+\varepsilon_{step})$. Finally, $\varepsilon_{max}$ should be chosen such that the inclusion rate in $S(\varepsilon_{max})$ is high, ideally 1. It may be the case, as in the synthetic data described herein, that some COs have no relations at all and don't belong in any cluster, so it may not indicate any inaccuracy if the inclusion rate does not reach 1.

In order to allow for a higher order direct comparison of COs without having to examine overlapping clusters of COs for many different values of ε and k, a table of information based on the hierarchical clustering data was created. The table is n(n−1)/2 by d+1, where n is the number of COs. Each row of the table represents a distinct pair of COs, and the ith column is the minimal value of ε, if any, for which the pair of COs are in the same component of $G_i(\varepsilon)$. The table in FIG. 8 is a comparison of the COs in columns 1 and 2, which determines the nature of their relationship outside of any context. For example, the second row shows that AIRBAG WARNING LIGHT< >ON and WIRES< >RUBBING tend to be clustered together in $G_4(\varepsilon)$, indicating a chain of co-occurrences leading from HARNESS< >SHORTS to LINE< >SHORTS involving at least two other COs. However, there may be many such chains corresponding to different real world contexts. For that reason, the COs contained in the vertices of the connected components of $G_k(\varepsilon)$ are output directly for fixed ε and k. The table in FIG. 9 lists example cluster outputs for ε=0.15 and k=4, with each row representing a cluster of COs. Note that wire-related customer observables are clustered with air bag related COs in row 2 and in row 9.

(3.7) Results on Synthetic Data

Since it is difficult to quantify results on GART data without ground truth, synthetic data was generated, which consists of lists made up of 500 "customer observables" arbitrarily labeled as integers from 1 to 500. These numbers are only labels, since the "customer observables" here are abstract and do not represent anything. Random networks are generated on subsets of nodes which represent hidden causal associations on clusters of COs. These subsets are taken to be 0 through 99, 100 through 199, 200 through 299, 300 through 399, and 400 through 499. That is, the clusters are determined by the leading digit of the CO label. For each cluster, 500 links are chosen uniformly at random which represent causal relations between COs in that cluster. These five clusters and the networks constructed on them represent the complex underlying relationships between the synthetic COs, and the objective is to recover the clusters without any knowledge of the underlying networks of relationships.

To create a dataset, 1,000,000 incidents based on these underlying relationships were generated. For each incident, the system described herein samples from a power law distribution with exponent 2.5 to determine the length of the incident, chooses a random CO as the initial entry of the incident vector, and then successively chooses a neighbor of the last drawn CO for the next entry until all entries are chosen. For example, if the incident vector is length 3, the system first chooses a random number from 0 to 499 to represent the initial CO. If it is, for instance, 354, select a random neighbor of 354 in the network placed on the cluster containing 300 to 399 for the second entry. Then, choose a neighbor of the second entry to determine the third entry. Finally, generate a geometrically distributed amount of noise.

Figure 6:
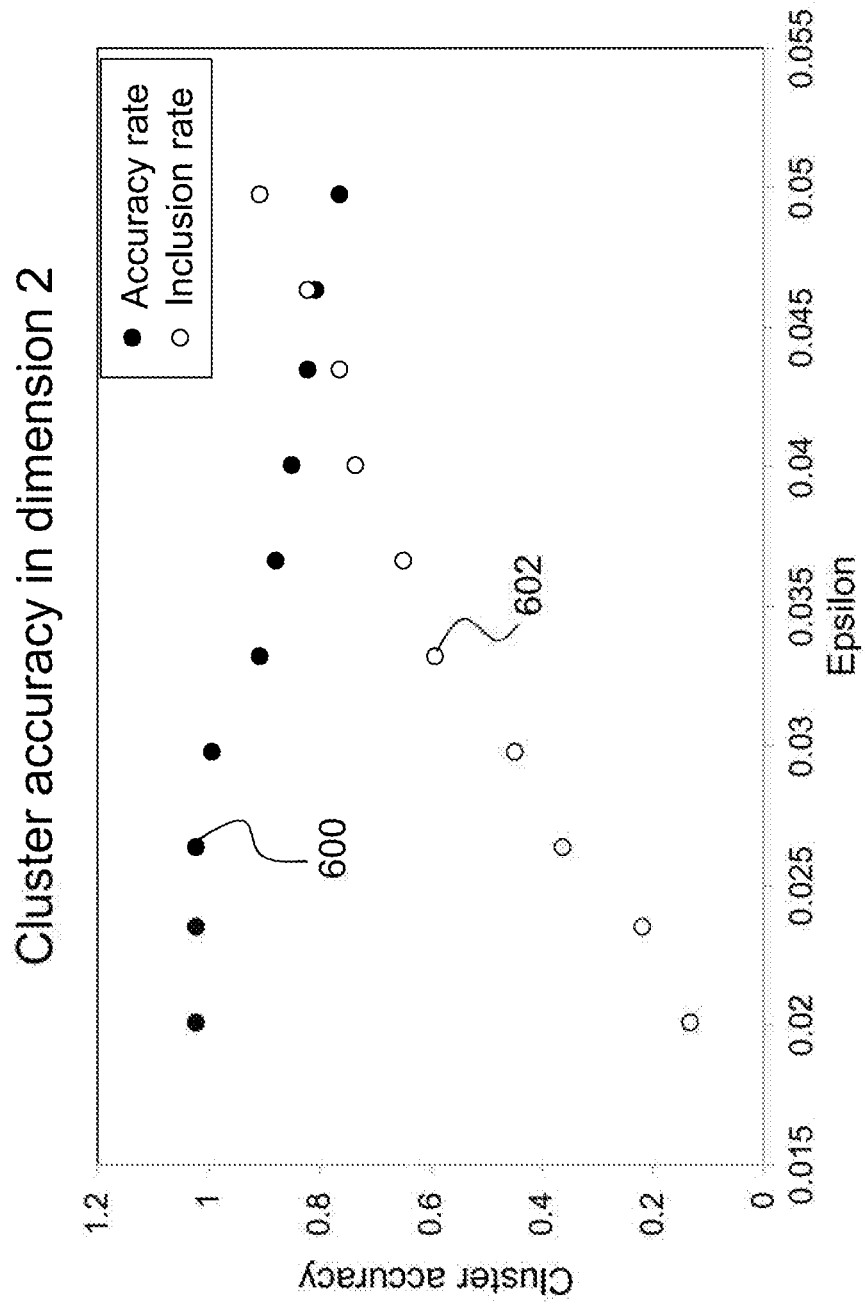
FIG. 6 is an illustration of cluster accuracy results for clustering output from $G_2(\varepsilon)$ for $\varepsilon=0.02$ to $\varepsilon=0.05$ according to some embodiments of the present disclosure.
Figure 7:
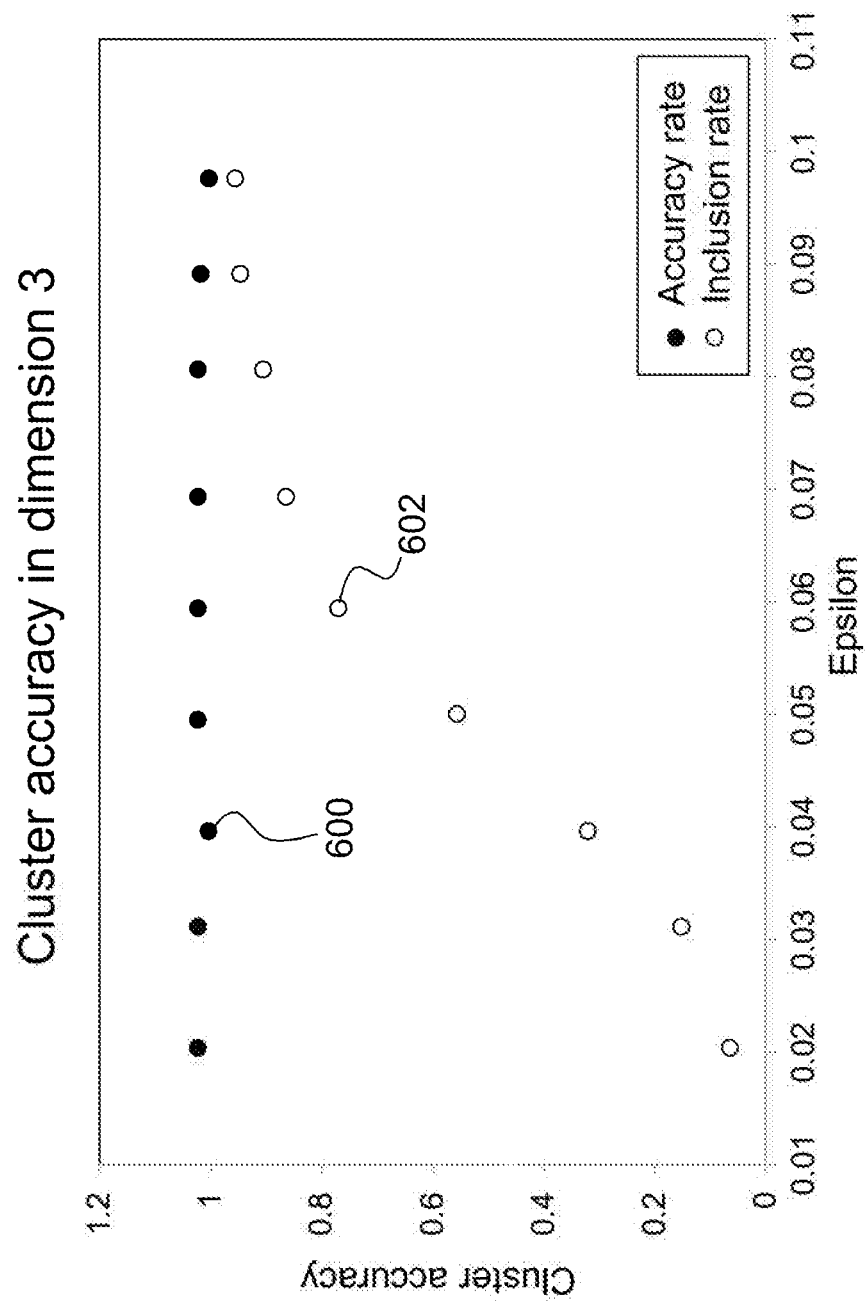
FIG. 7 is an illustration of cluster accuracy results for clustering output from $G_3(\varepsilon)$ for $\varepsilon=0.02$ to $\varepsilon=0.1$ according to some embodiments of the present disclosure.

Using this dataset of 1,000,000 incidents, the system builds a set of simplicial complexes and constructs the networks $G_k(\varepsilon)$. Each entry of each connected component of $G_k(\varepsilon)$ is checked and counted as a positive if the majority of entries in that component belong to the same cluster as determined from the ground truth. Note that for a smaller epsilon, the components created will be smaller and some COs may not be included in any clusters. FIG. 6 is a plot depicting accuracy and inclusion results for dimension 2, and FIG. 7 is a plot depicting accuracy and inclusion results for dimension 3. Both the accuracy rate, the portion of COs placed in the correct cluster, along with the inclusion rate, the portion of COs included compared to the total number of COs, are plotted. In both FIGS. 6 and 7, filled circles 600 represent accuracy results, and unfilled circles 602 represent inclusion results. It is likely that a low inclusion rate is a strong indication that many important relations are missing. In this case, the system will tend to see smaller clusters of COs with relations that are more strongly represented in the data, as demonstrated by the very high values of accuracy for lower values of ε.

In summary, described herein is a method of extracting overlapping clusters of customer observables extracted from GART incident data. The technique according to embodiments of the present disclosure captures high order co-occurrences of customer observables via a simplicial complex, and outputs clusters of COs that are related by causal links or similarity. The system accurately outputs clusters of causally related collections of COs on synthetic data. In addition, the system described herein finds pairwise comparisons of COs as shown in the table of FIG. 8, which eliminates the context in which the COs occur, but determines the strength of the relationship of the COs out of context. Existing systems lack the fundamental notion of "persistence" that is utilized in the system described herein to distinguish between small, more persistent clusters that indicate strong, direct relations and larger, less persistent clusters that indicate more indirect relations. The usage of persistent geometry to capture both direct and indirect co-occurrence relations in multiple dimensions is unique to the method according to embodiments of the present disclosure.

The invention described herein can be used to analyze various types of customer observables (COs), including COs extracted from warranty data, a technical center, and repair records from vehicle manufacturing companies, for example. In particular, clusters of "related" COs are output, which may be related in various different contexts. COs may be related in terms of similarity, such as problems affecting the same vehicle part, or by causality, such as an issue with one part causing an unexpected issue with another vehicle part. This may yield actionable insights to subject matter experts who can identify which COs are related due to similarity and infer that other relations may be causal. If a previously unknown causal relation is suspected, it may lead to investigation of the hardware itself to find a mechanical cause, which could potentially result in a recall. That is, if customer observables A, B, and C are all present in the same cluster, but a subject matter expert can readily see that A and B are similar, then both A and B may cause or be caused by C, or C may be a false positive. To give a concrete example, suppose there are three COs: TIRE< >FLAT, TIRE< >NAIL, and COOLING SYSTEM< >CLEAR. In this case, a subject matter expert would not consider the first two COs to be interesting, since the relation is obvious, but the final CO (i.e., CLEAR), which likely indicates that the coolant was flushed, is either a false positive or a highly unexpected relation between the cooling system and flat tires.

Some COs, such as those indicating the air bag deploys or the steering wheel becomes inoperative, are associated with hazardous conditions that may lead to an accident. If a previously unknown relation with such a hazardous CO is revealed by this method, a subject matter expert could be alerted to investigate the hardware and determine if there is a mechanical fault that is causing the relation. If so, this information can be passed on to other experts who could decide whether to recommend a recall in order to correct the fault. This could potentially identify emerging issues that are model specific. Additionally, the alert regarding a hazardous CO can be used to halt production of a specific vehicle part or model. For example, a previously unknown relation can be automatically added to a database to be later confirmed as a potential relation by a subject matter expert, and sales of an item can be automatically halted if the relation involves dangerous components. Additionally, a recall of a product could be issued automatically, where the alert is a message (e.g., via email or text message) sent to registered users/owners of the product. Alternatively, a signal could be automatically transmitted directly to the vehicle (via, for example, a cellular, wireless, or satellite-based communications network) to activate a warning light or to present a message on a graphical user interface. That message could take the form of an alert instructing the user of the vehicle to have it serviced. For instance, if an extracted relation does not exist in the known relations data, then the system automatically generates an alert for the user of the vehicle to have the vehicle serviced.

There are also applications to natural language processing, as the clustering algorithm according to embodiments of the present disclosure could be applied to words taken from a collection of text in order to output overlapping clusters of words. Context is extremely important in natural language processing, and the co-occurrence simplicial complexes are far better at capturing multiple contexts in a word that can occur via connected components of face networks (see Section 3.4) compared to co-occurrence networks that only capture pairwise relations and lose the specific context. In one embodiment, clustering is performed on a set of keywords in a social media posts (e.g., tweets) in order to separate them into appropriate categories based on the particular combination of keywords used in each tweet. As a simple example, the keyword "oil" may be contained in three different clusters corresponding to different contexts in which it is used: as a food ingredient, as a resource for trade, and as an energy resource. In the first case it would be associated with other foods, in the second it would be associated with trade terminology, such as "tariff" or "agreement," and in the last case it may be associated with words like "renewable" and "natural gas."

Another possible application is feature learning. A vector of features could be encoded as an "incident" which describes which features in the particular incident are unusual, such as by being more than a single standard deviation away from the mean. The clustering algorithm described herein can be used to discover complex information about high dimensional interaction of the features. Consider images with features encoded as high dimensional vectors, all of which have some distinct feature, such as a traffic sign. By considering each image as an "incident" as described above, the system described herein can identify clusters of interacting features. This identifies not just a list of important features, but also groups the features according to their dependencies.

FIG. 10 is a flow diagram illustrating using the processor 104 to control a device 1000 based on the alert generated by the system. Non-limiting examples of devices 1000 that can be controlled via the processor 104 include the display device which outputs unlisted relations to the subject matter expert. All new relations between COs are stored in a database and an alert is sent to a subject matter expert in other to confirm that the relation is valid. Both the database and the display screen on which the alert is displayed could be considered devices 1000 that are controlled.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for extracting multi-scale hierarchical clustering on lists of customer observables (COs) in a vehicle, the system comprising:
   one or more processors and a non-transitory computer-readable medium having executable instructions encoded thereon such that when executed, the one or more processors perform operations of:
   selecting at least one parameter having a value for a set of incident data comprising COs data;
   generating simplicial complexes from the COs data based on the at least one selected parameter;
   generating face networks from the simplicial complexes;
   for each face network, extracting a set of connected components; and
   transforming each connected component in each set of connected components to a cluster of related COs, resulting in at least a first extracted relation between COs, wherein the first extracted relation is used to automatically generate an alert at a client device when a second extracted relation different from one of the first extracted relations results from said transformation.

2. The system as set forth in claim 1, where in generating the simplicial complexes, the one or more processors perform operations of:
   determining a pairwise mutual information measure for each pair of COs;
   linking each pair of COs with a pairwise mutual information measure greater than the value of the at least one selected parameter;
   identifying k cliques of COs in which every possible link exists; and
   replacing each k clique with a k simplex.

3. The system as set forth in claim 2, wherein each face network is a network created by linking all k-simplices that share a face.

4. The system as set forth in claim 1, where in transforming each connected component to a cluster of related COs, the one or more processors perform an operations of:
for each distinct connected component C of a face network, transforming the connected component C into a list of vertices; and
based on the list of vertices, outputting multiscale hierarchical, overlapping clusters of COs.

5. The system as set forth in claim 1, wherein the extracted relations between COs are used to identify different contexts in which COs appear and relations between COs.

6. The system as set forth in claim 1, wherein the one or more processors further perform an operation of varying the value of the at least one parameter, wherein only COs which persist as the value of the at least one parameter is varied are used for generating simplicial complexes.

7. A computer implemented method for extracting multiscale hierarchical clustering on lists of customer observables (COs) in a vehicle, the method comprising an act of:
causing one or more processors to execute instructions encoded on a non-transitory computer-readable medium, such that upon execution, the one or more processors perform operations of:
selecting at least one parameter having a value for a set of incident data comprising COs data;
generating simplicial complexes from the COs based on the at least one selected parameter;
generating face networks from the simplicial complexes;
for each face network, extracting a set of connected components; and
transforming each connected component in each set of connected components to a cluster of related COs, resulting in at least a first extracted relation between COs, wherein the first extracted relation is used to automatically generate an alert at a client device when a second extracted relation different from one of the first extracted relations results from said transformation.

8. The method as set forth in claim 7, where in generating the simplicial complexes, the one or more processors perform operations of:
determining a pairwise mutual information measure for each pair of COs;
linking each pair of COs with a pairwise mutual information measure greater than the value of the at least one selected parameter;
identifying k cliques of COs in which every possible link exists; and
replacing each k clique with a k simplex.

9. The method as set forth in claim 8, wherein each face network is a network created by linking all k-simplices that share a face.

10. The method as set forth in claim 7, where in transforming each connected component to a cluster of related COs, the one or more processors perform an operations of:
for each distinct connected component C of a face network, transforming the connected component C into a list of vertices; and
based on the list of vertices, outputting multiscale hierarchical, overlapping clusters of COs.

11. The method as set forth in claim 7, wherein the extracted relations between COs are used to identify different contexts in which COs appear and relations between COs.

12. The method as set forth in claim 7, wherein the one or more processors further perform an operation of varying the value of the at least one parameter, wherein only COs which persist as the value of the at least one parameter is varied are used for generating simplicial complexes.

13. A computer program product for extracting multiscale hierarchical clustering on lists of customer observables (COs) in a vehicle, the computer program product comprising:
computer-readable instructions stored on a non-transitory computer-readable medium that are executable by a computer having one or more processors for causing the processor to perform operations of:
selecting at least one parameter having a value for a set of incident data comprising COs data;
generating simplicial complexes from the COs data based on the at least one selected parameter;
generating face networks from the simplicial complexes;
for each face network, extracting a set of connected components; and
transforming each connected component in each set of connected components to a cluster of related COs, resulting in at least a first extracted relation between COs, wherein the first extracted relation is used to automatically generate an alert at a client device when a second extracted relation different from one of the first extracted relations results from said transformation.

14. The computer program product as set forth in claim 13, where in generating the simplicial complexes, the one or more processors perform operations of:
determining a pairwise mutual information measure for each pair of COs;
linking each pair of COs with a pairwise mutual information measure greater than the value of the at least one selected parameter;
identifying k cliques of COs in which every possible link exists; and
replacing each k clique with a k simplex.

15. The computer program product as set forth in claim 14, wherein each face network is a network created by linking all k-simplices that share a face.

16. The computer program product as set forth in claim 13, where in transforming each connected component to a cluster of related COs, the one or more processors perform an operations of:
for each distinct connected component C of a face network, transforming the connected component C into a list of vertices; and
based on the list of vertices, outputting multiscale hierarchical, overlapping clusters of COs.

17. The computer program product as set forth in claim 13, wherein the extracted relations between COs are used to identify different contexts in which COs appear and relations between COs.

18. The computer program product as set forth in claim 13, wherein the one or more processors further perform an operation of varying the value of the at least one parameter, wherein only COs which persist as the value of the at least one parameter is varied are used for generating simplicial complexes.

* * * * *